United States Patent Office 3,152,099
Patented Oct. 6, 1964

3,152,099
COMPOSITION BRAKE BLOCK
Charles L. E. de Gaugue, Jr., Califon, N.J., assignor to Johns-Manville Corporation, New York, N.Y., a corporation of New York
No Drawing. Filed June 3, 1960, Ser. No. 33,647
6 Claims. (Cl. 260—38)

This invention relates to composition brake blocks for railroad service, and more particularly to molded composition brake blocks which have long service life under exaggerated conditions imposed by prolonged exposure to high temperatures and abrasion.

Previous molded composition brake blocks for railroad service, such as the products of United States Letters Patent No. 2,686,140 and 2,861,964, provide excellent uniform friction levels for good stopping distances throughout all speeds up to and including high speed stops from 100 m.p.h., uniform wet to dry friction and stopping distance ratios, and decidedly improved shoe or wear life, among other advantages, over the previous conventional all cast iron railroad brake blocks. However, notwithstanding their excellent performance, wearing characteristics and the like qualities in conventional passenger and freight service, the products of said patents are taxed when subjected to the very severe and exaggerated conditions imposed by the high temperatures and abrasion of continuously braking very heavy wheel loads on extended grades such as restraining a train to a speed of approximately 20 m.p.h. for periods of 1 hour or more while continuously descending grades of approximately 3% with wheel loads in excess of 30,000 pounds.

It is a primary object of this invention to provide a composition brake block for railroad service which substantially maintains the good qualities of the previous products of U.S. Patents Nos. 2,686,140 and 2,861,964 while withstanding the exaggerated service conditions imposed by prolonged exposure to the high temperatures, pressures and/or abrasion of continuous braking of heavily loaded equipment on extended grades.

It is a more specific object of this invention to provide a composition brake block for railroad service which will stand up under and hold high wheel loads of at least about 33,000–34,000 pounds to constant speeds of approximately 20 m.p.h. while descending continuous grades of 2½– 3% for periods of 1 hour or more without flaming, damage or destruction, or loss of friction to the degree that the train runs away.

It is a still further object of this invention to provide a composition railroad brake block which has a long service life and substantially constant and adequate friction level under the most severe and adverse conditions of continuous braking.

These and other objects or advantages of the instant invention will become more apparent from the hereinafter detailed description.

This invention consists primarily of an improved friction material composition which has been discovered for the manufacture of railroad brake blocks for use under severe service conditions such as presented by ore trains in mountainous areas. The novel composition of this invention consists of a relatively specific formulation or narrow range of component ingredients providing a friction material or brake block composed substantially of cast iron chips, asbestos fiber, inorganic fillers and a relatively high proportion of a heavily loaded, thermosetting resin reinforced, vulcanizable, heat resistant rubber binder or matrix.

More specifically, the subject friction composition for railroad brake blocks consists essentially of the following components in the approximate percentages, by weight of the total, for the broadest and preferred ranges of the invention:

| Ingredient | Broad | Preferred |
|---|---|---|
| Cast iron chips | 25–40 | 28–32 |
| Asbestos fiber | 4–12 | 5–3 |
| Rubber binder | 4–12 | 7–8 |
| Thermosetting resin stiffener | 2–6 | 8–4 |
| Sulfur | 1.5–4.5 | 3–3.5 |
| Litharge | 5–25 | 17–22 |
| Zinc oxide | 2–13 | 7.5–10 |
| Carbon black | 0–16 | 9–14 |
| Lead powder | 0–7 | 4–6 |
| Graphite powder | 0–7 | 4–6 |

The cast iron chips preferably consist of particles comparable in size and composition to those disclosed in U.S. Patent No. 2,686,140. The rubber binder component should comprise one or a combination of the more heat resistant vulcanizable synthetic rubber compositions available fortified or strengthened with up to about 6% by weight of the total of a temperature resistant thermosetting resin or resins. Suitably heat resistant rubbers capable of withstanding the temperatures and the severe service conditions encountered comprise copolymers of butadiene-styrene (GRS) or butadiene-acrylonitrile (Buna N) or preferably mixtures of these vulcanizable synthetics. The bonding phase is heavily loaded with carbon black to further its heat and abrasion resistance and with inorganic fillers typified by litharge and zinc oxide. The fibrous component preferably should be asbestos of one of the shorter varieties, e.g., 7–F or 7–D (Standard Quebec Screen Test). The balance of the constituents of vulcanizing ingredients, inorganic loading fillers, modifiers and the like are all of a conventional particulate size and form suitable for friction material application.

A satisfactory and preferred means of producing the wear and temperature resistant brake blocks of this invention comprises simply soaking the rubber component, e.g., butadiene-styrene and/or butadiene-acrylonitrile copolymers, in sufficient gasoline and/or petroleum derived aromatic solvents (such as Standard Oil's Solvesso) to gelatinize the elastomer(s), adding the dry powdered ingredients such as vulcanizing agents, fillers, etc., and mixing until dispersed throughout the gelatinized rubbery mass, then adding the asbestos fiber followed by further mixing until all components are uniformly blended into a coherent moist mass. The resulting mixture of ingredients is extruded as pellets or otherwise shaped into discrete particles for drying and subsequent molding. Once dried, these pellets or particles are molded or consolidated into a suitable configuration such as a conventional composition railroad brake block by the application of pressure and heat, e.g., 3,000 p.s.i. and 90 pounds of steam for a period of 40 minutes, to form a dense block and vulcanize the binder component and initiate the cure of the thermosetting resin stiffener. The thus formed and consolidated brake blocks are preferably baked for approximately 12 hours at a temperature in the vicinity of 300° F. to complete the cure of the resin reinforcement.

The following examples illustrate the novel, high temperature, long wearing composition railroad brake blocks of this invention. Proportions of all ingredients are given in percentages by weight of the total mass of the block:

| Ingredients | Example I, percent | Example II, percent |
|---|---|---|
| Cast iron chips | 30.0 | 30.0 |
| Asbestos fiber | 5.75 | 7.5 |
| Butadiene-styrene | 5.0 | 5.0 |
| Butadiene-acrylonitrile | 2.5 | 2.5 |
| Phenol formaldehyde resin | 3.75 | 3.75 |
| Sulfur | 3.0 | 3.2 |
| Litharge | 20.0 | 18.0 |
| Zinc oxide | 10.0 | 7.5 |
| Carbon black (powder) | 10.0 | 13.5 |
| Lead (powder) | 5.0 | 4.5 |
| Graphite (powder) | 5.0 | 4.5 |

Brake block products of this invention, specifically those comprising the constituents of Examples I and II prepared by the above described procedure, were compared with commercial brake blocks of an identical size and configuration comprising the compositions prepared in accordance with the teachings of U.S. Patent No. 2,686,140 and No. 2,861,964 by subjecting sample products of the compositions of Examples I and II of this application and of the said patents to identical braking conditions equivalent to descending a 2½% grade while holding wheel loads of the indicated amount at a constant speed of 20 m.p.h. The respective brake blocks withstood such braking conditions as follows:

| Sample | Wheel load (pounds) | Time on grade, min. | Block wear (cu. in./trip) | Remarks |
|---|---|---|---|---|
| 2,686,140 | 33,115 | 54 | 9.15 | Heavy smoke and sparks, grooving of wheel. |
| 2,861,964 | 32,682 | ¹30 | 30.1 | Block ignited at 30 minutes. |
| Example I | 33,434 | 54 | 5.31 | Moderate smoke. |
| Example II | 33,115 | 60 | 7.67 | Do. |

¹ Failed.

Thus, although the commercial brake blocks of U.S. Patents Nos. 2,686,140 and 2,861,964 have been highly successful on both conventional passenger and freight railroad equipment, extensive and severe braking conditions such as found on some heavily loaded trains in mountainous areas have in some instances taxed these conventional brake blocks to the point of decidedly reducing their usually long wear life. However, the brake blocks of the instant invention as established hereinbefore have been found to stand up under any such conditions while substantially preserving the good characteristics or properties of said previous composition railroad brake blocks.

It should be understood that the above disclosure is for the purpose of illustration only and not restriction, and that variations within the scope of this invention are to be included within the spirit of the appended claims.

What I claim is:

1. A molded composition railroad brake block capable of withstanding exaggerated conditions imposed by prolonged exposure to high temperatures and abrasion and of maintaining a long service life which consists essentially of:
   A. a continuous binder matrix of:
      (1) heat resistant rubber of at least one member selected from the group consisting of butadiene-styrene copolymers and butadiene-acrylonitrile copolymers in amount of 4 to 12% by weight of the block,
      (2) thermosetting resin stiffener in amount of 2 to 6% by weight of the block;
   and dispersed throughout the binder matrix in percentages by weight of the block;
   B. friction modifiers and curing agents for the matrix consisting essentially of:
      (1) 25 to 40% cast iron chips,
      (2) 4 to 12% asbestos fiber,
      (3) 1.5 to 4.5% sulfur,
      (4) 5 to 25% litharge,
      (5) 2 to 13% zinc oxide,
      (6) 0 to 16% powdered carbon black,
      (7) 0 to 7% powdered lead,
      (8) 0 to 7% powdered graphite;
   said rubber, resin stiffened binder matrix being cured.

2. The molded composition railroad brake block of claim 1 wherein the thermosetting resin stiffener of the continuous binder matrix is phenol formaldehyde resin.

3. A molded composition railroad brake block capable of withstanding exaggerated conditions imposed by prolonged exposure to high temperatures and abrasion and of maintaining a long service life which consists essentially of:
   A. a continuous binder matrix of:
      (1) heat resistant rubber of at least one member selected from the group consisting of butadiene-styrene copolymers and butadiene-acrylonitrile copolymers in amount of about 7 to 8% by weight of the block,
      (2) thermosetting resin stiffener in amount of about 3 to 4% by weight of the block;
   and dispersed throughout the binder matrix in percentages by weight of the block;
   B. friction modifiers and curing agents for the matrix consisting essentially of:
      (1) about 28 to 32% cast iron chips,
      (2) about 5 to 8% asbestos fiber,
      (3) about 3 to 3.5% sulfur,
      (4) about 17 to 22% litharge,
      (5) about 7.5 to 10% zinc oxide,
      (6) about 9 to 14% powdered carbon black,
      (7) about 4 to 6% powdered lead,
      (8) about 4 to 6% powdered graphite;
   said rubber, resin stiffened binder matrix being cured.

4. The molded composition railroad brake block of claim 3 wherein the thermosetting resin stiffener of the continuous binder matrix is phenol formaldehyde resin.

5. A molded composition railroad brake block capable of withstanding exaggerated conditions imposed by prolonged exposure to high temperatures and abrasion and of maintaining a long service life which consists essentially of:
   A. a continuous binder matrix of:
      (1) heat resistant rubber of at least one member selected from the group consisting of butadiene-styrene copolymers and butadiene-acrylonitrile copolymers in amount of approximately 7.5% by weight of the block,
      (2) thermosetting phenol formaldehyde resin stiffener in amount of approximately 3.75% by weight of the block;
   and dispersed throughout the binder matrix in percentages by weight of the block;
   B. friction modifiers and curing agents for the matrix consisting essentially of:
      (1) approximately 30% cast iron chips,
      (2) approximately 5.75% asbestos fiber,
      (3) approximately 3% sulfur,
      (4) approximately 20% litharge,
      (5) approximately 10% zinc oxide,
      (6) approximately 10% powdered carbon black,
      (7) approximately 5% powdered lead,
      (8) approximately 5% powdered graphite;
   said rubber, resin stiffened binder matrix being cured.

6. A molded composition railroad brake block capable of withstanding exaggerated conditions imposed by prolonged exposure to high temperatures and abrasion and of maintaining a long service life which consists essentially of:

A. a continuous binder matrix of:
   (1) heat resistant rubber of at least one member selected from the group consisting of butadiene-styrene copolymers and butadiene-acrylonitrile copolymers in amount of approximately 7.5% by weight of the block,
   (2) thermosetting phenol formaldehyde resin stiffener in amount of approximately 3.75% by weight of the block;

and dispersed throughout the binder matrix in percentages by weight of the block;

B. friction modifiers and curing agents for the matrix consisting essentially of:
   (1) approximately 30% cast iron chips,
   (2) approximately 7.5% asbestos fiber,
   (3) approximately 3.2% sulfur,
   (4) approximately 18% litharge,
   (5) approximately 7.5% zinc oxide,
   (6) approximately 13.5% powdered carbon black,
   (7) approximately 4.5% powdered lead,
   (8) approximately 4.5% powdered graphite;

said rubber, resin stiffened binder matrix being cured.

References Cited in the file of this patent

UNITED STATES PATENTS

| | | |
|---|---|---|
| 2,155,020 | Nanfeld | Apr. 18, 1939 |
| 2,211,354 | Spokes | Aug. 13, 1940 |
| 2,267,803 | Spokes | Dec. 30, 1941 |
| 2,686,140 | De Gaugue | Aug. 10, 1954 |
| 2,861,964 | De Gaugue et al. | Nov. 25, 1958 |
| 2,901,456 | Spokes et al. | Aug. 25, 1959 |

OTHER REFERENCES

Schildknecht: "Vinyl and Related Polymers," chapter II, John Wiley and Sons, 1952. (Pages 115, 117, 118 and 290–292 relied on.)

Martin: "The Chemistry of Phenolic Resins," chapter 4, John Wiley and Sons, 1956. (Page 87 relied on.)

UNITED STATES PATENT OFFICE
CERTIFICATE OF CORRECTION

Patent No. 3,152,099                                    October 6, 1964

Charles L. E. de Gaugue, Jr.

It is hereby certified that error appears in the above numbered patent requiring correction and that the said Letters Patent should read as corrected below.

Column 2, in the table under the heading "Preferred" line 4 thereof, for "8-4" read -- 3-4 --.

Signed and sealed this 26th day of January 1965.

(SEAL)
Attest:

ERNEST W. SWIDER
Attesting Officer

EDWARD J. BRENNER
                                                                                Commissioner of Patents